Patented July 5, 1938

2,122,544

UNITED STATES PATENT OFFICE 2,122,544

PROCESS FOR THE RECOVERY OF SULPHUR DIOXIDE

Conway, Baron von Girsewald, Hans Weidmann, and Gerhard Roesner, Frankfort-on-the-Main, Germany, assignors to American Lurgi Corporation, New York, N. Y., a corporation of New York No Drawing. Application April 14, 1934, Serial No. 720,654. In Germany May 6, 1933

4 Claims. (Cl. 23—178)

This invention relates to a process for the recovery of sulphur dioxide from gases containing same.

It is known that sulphur dioxide can be recovered from gases containing it, by treating such gases with a mixture of aromatic amines and water, and heating the reaction product, the residual absorption mixture being then employed again for the treatment of gas contaning sulphur dioxide.

It has now been ascertained that, when the absorption treatment is repeated in this manner, difficulties are caused by the absorption mixture thickening and frothing to such an extent that it can no longer be properly passed through the pipes, pumps and absorption apparatus, and is thereby rendered unsuitable for further use.

Further investigations have shown that these troubles which preclude the repeated employment of the absorption mixture are attributable to the formation and precipitation of sulphates of the organic bases employed, due to the oxidation of the sulphurous acid, said sulphates being more sparingly soluble than the sulphites which are formed in the first place, of the corresponding organic bases.

It has been ascertained that the formation of the said precipitates, and the troubles resulting therefrom, can be successfully counteracted by treating the absorption mixture, either before or after, or also during the absorption process, with substances, such as the oxides, hydroxides, carbonates and neutral or acid sulphites, or other salts, of weak acids, of the alkali metals, or of ammonia or magnesium, which are capable of transforming—in some cases only at the elevated temperature employed for expelling the absorbed sulphur dioxide—the organic sulphates, formed in the absorption mixture, into water-soluble inorganic sulphates, and thereby bringing them into solution in the aqueous phase of the absorption mixture. The organic bases previously combined with the sulphuric acid are hereby liberated and therefore become available for further absorption.

The addition of basic substances to the absorption mixture, before or during the action of the gases containing sulphur dioxide, first cause said substances to be transformed, by the sulphur dioxide, into sulphites which, during the subsequent heating of the $SO_2$-laden absorption mixture, react with the sulphates of the organic bases formed therein, $SO_2$ being liberated.

Apart from the elimination of the cause of the thickening and frothing of the absorption mixture, with liberation, for fresh utilization, of such amounts of the bases as are combined with sulphuric acid, the additional advantage is obtained, through the transference of the resulting water-soluble sulphates into the aqueous phase, of effecting a considerable diminution in the solubility of the organic bases, employed for the absorption, in the aqueous phase. Thus, for example, experiments performed at 40–50° C. have revealed the following solubilities for commercial xylidine containing about 60% of metaxylidine.

| | Grams of xylidine per litre |
|---|---|
| In water | 6.9 |
| In a solution of $Na_2SO_4$ with 20 grams of sulphur per litre | 1.5 |
| In a solution of $Na_2SO_4$ with 50 grams of sulphur per litre | 0.6 |

This salting-out action of the saline solution is therefore of great importance, since it is always necessary to reject a portion of the aqueous solution from time to time. The resulting loss of the comparatively expensive bases is thereby minimized by the presence of the salts.

A further advantage of the prescribed measure consists in that as the concentration of the salts in the aqueous solution increases, the capacity of the solution for absorbing oxygen diminishes, and consequently the formation of sulphates, through the action of the oxygen contained in the treated gases, is also lessened.

The readily soluble sulphates that have passed into solution in the aqueous phase can be separated therefrom, when their concentration has increased to such an extent as to have an adverse effect on the capacity of the absorption mixture of taking up sulphur dioxide, by crystallization for example in the form of Glauber salt containing water of crystallization, and the residual aqueous solution can again be employed, for example in association with xylidine for absorption. Alternatively, the solution that has become unduly enriched in (for example) sodium sulphate, may, of course, be entirely or partially replaced by water, after each absorption or several absorptions.

Suitable absorption agents comprise organic bases, especially aromatic and aliphatic amines of diversified cyclic and acyclic nature, such as aniline and its homologues, toluidines and xylidines, also pyridin, pyridin bases, quinolin, triethanolamine, hydroxylamine, hydrazine and the like, and mixtures of such bases, or substances containing such bases or mixtures thereof, and obtainable, at comparatively low prices, as technical crude and intermediate products, such as technical xylidine.

The absorption process can be carried out, in known manner, at moderate temperatures, for example not higher than about 35° C. and, if desired, under elevated pressure. The relative proportions of absorption agent and water may vary within wide limits, according to the nature of the absorption agent and the temperature, pressure and other working conditions. For example, it has been found advantageous, in employing crude xylidine, to take approximately equal proportions of xylidine and water. In the case of a roasting-furnace gas containing 7% of $SO_2$ by volume, 1 molecule of xylidine can absorb about 1 molecule of $SO_2$.

The decomposition of the sulphites of the organic bases, formed during the absorption process, which is accompanied by the liberation and recovery of the bases, is accomplished at elevated temperature, for example between 65° and 105° C. for example, in a still or a column apparatus. By operating under reduced pressure, correspondingly lower decomposition temperatures can be employed, and by interposing cooling and condensing apparatus, columns and the like, the vapours of absorption agent present in the outflowing gases can be condensed and returned to the absorption mixture. If the decomposition process be carried out properly, about 98% of the previously absorbed $SO_2$ can be extracted from the absorption mixture in each operation.

The residual mixture of absorption agent and water can be returned into circulation for a fresh absorption process.

The amount of the additions may, for example, be such as to suffice exactly for the decomposition of the sulphates of the organic bases contained in the absorption mixture. It may, however, also be large enough to decompose the small residual quantities of sulphites left, partly in the bases and partly in the aqueous phase in the expulsion of the $SO_2$, and thereby enable the absorbed sulphur dioxide to be completely recovered in each operation. In fact, in order to attain this result, the requisite excess of the added substance may even be incorporated with the absorption mixture prior to the absorption process. By operating in such a manner any sodium hydroxide or carbonate, for example, already present is converted in the first place, during the absorption process into the corresponding sulphite by the action of the sulphur dioxide. During the subsequent heating of the reaction mixture, for the purpose of expelling the absorbed sulphur dioxide, the said sulphite reacts with the initially formed sulphate of the organic base, said base and sulphur dioxide being thereby liberated.

The aforedescribed method of operating enables the aforesaid troubles to be avoided and one and the same quantity of organic base to be repeatedly used for fresh absorption treatments without any appreciable losses.

In carrying out the invention, a further reduction in the losses of the organic bases is obtained by allowing the exhaust gases from the absorption process and/or the sulphur dioxide recovered by heating the sulphite solution resulting from that process, to act, in presence of water, on substances, or mixtures of same, capable of splitting-up the sulphates, formed in the absorption process, in accordance with the invention.

Besides substances with a basic reaction, such as alkali hydroxides or carbonates, magnesium carbonate and the like, particular suitability for this purpose attaches to neutral or acid sulphites, for example those of the alkalis, including ammonium, or of magnesium. The selection from among these substances will have to be based on the conditions of each case. Thus, for example, if, in the treatment of the waste gas from the absorption process, it should be desired to extract from the gas not only the organic base, but also any sulphur dioxide still contained therein, the choice, for the treatment of said gas, will fall on a substance with a basic reaction, or a carbonate or neutral sulphite, or a sulphite that contains more $SO_2$ than a normal sulphite, but not an acid sulphite which, like an alkali bisulphite for example, contains too much sulphurous acid to be able to take up from the gas the residual amounts of $SO_2$ still present in the latter.

Since, on the other hand, in the treatment of the concentrated sulphur dioxide obtained by heating the $SO_2$-laden absorption solution, the said reagent substances are able, in proportion as their basicity is higher, to extract from the gas an increasing amount of $SO_2$, with formation of sulphite or bisulphite, preference will be given, if this result is undesired, to acid sulphites, or bisulphites, which still offer the advantage of a stronger absorptive capacity for the organic bases.

Moreover, for example, the employment of carbonates—e. g. of the alkalis, ammonia or magnesium—will be discarded in cases where trouble might arise from the carbon dioxide liberated during the reaction between these carbonates and the sulphates of the organic bases, for example in the after treatment of the concentrated sulphur dioxide which has been expelled from the absorption solution and is then to be liquefied.

The treatment may consist, for example, in passing the gas to be purified through a tower irrigated with the solution, such as a 25% solution of alkali hydroxide, carbonate, sulphite or bisulphite, magnesium sulphite, or a suspension, for example of magnesium carbonate, and the like.

When substances which do not have an acid reaction are employed there is obtained, in addition to the absorption of the residual amounts of the organic base, in the treated gas, by the absorption of sulphur dioxide—for example residual sulphur dioxide from the waste gases from the absorption process—a solution of sulphite, together, in some cases, with residual free alkali or acid sulphite.

After sufficient enrichment with organic base, these solutions can be employed in the main process, with the result that the inorganic sulphite contained in the solution decomposes, into the free organic bases and water-soluble inorganic sulphates, the organic-base sulphates formed by secondary reaction. At the same time, the organic bases which have been combined as sulphite, such as xylidine sulphite, in the solutions during the washing process, are set at liberty, through the decomposition of the sulphite by liberating at the same time sulphur dioxide, both the organic bases accumulated in the solution and the sulphurous acid contained in the latter being consequently rendered available for use.

The removal of the final traces of the organic bases which is rendered possible by the hereindescribed treatment, offers in respect of the concentrated sulphur dioxide recovered in the main process the special advantage, in addition to the recovery of the corresponding portions of the bases, of eliminating troubles which might arise during the further employment of the sulphur dioxide for certain purposes, such as liquefaction, through the presence of the organic bases therein.

The invention may be carried into practical effect for example, by passing—preferably in an upward direction—the $SO_2$-containing gas, such as roasting-furnace gas, through a series of towers charged with fillers and over which a mixture of xylidine and water is pumped. The effluent gas, thereby extensively freed from its content of $SO_2$, is then passed through a tower irrigated with a solution of sodium carbonate, for example of 25% strength, by which means any accompanying traces of xylidine and the remaining sulphur dioxide are extracted from the current of gas. In place of, or addition to, the sodium carbonate solution, a solution of sodium sulphite, or a sodium carbonate solution that has already been more or less enriched with sulphite in the hereindescribed manner, may be employed, which will also combine the residual xylidine present in the waste gas whilst retaining sulphur dioxide in the form of sodium bisulphite. The solution of sodium sulphite or bisulphite, or the sulphite-bearing solution of sodium carbonate, recovered in said tower, is added to the absorption mixture coming from the tower, in a proportion equivalent to the content of sulphate in the absorption mixture, either after the absorption process, or only during the expulsion of the sulphur dioxide. Alternatively, it may be employed, subsequently to the expulsion, in a separate operation for the transformation of the sulphates of the organic bases in the distillation residue. In any case, this procedure results in also rendering available the sulphur dioxide that is washed out with the solution of sodium carbonate or sulphite.

The following comparative examples will serve for a clearer explanation of the invention.

Example Ia

A gaseous mixture containing 8% by volume of $SO_2$ and 9% by volume of $O_2$, the remainder being $N_2$, was passed, at room temperature, through an absorption tower, in counterflow to a mixture of equal parts, by volume, of crude xylidine and water, until approximate saturation was attained, that is, until the absorption of $SO_2$, which was practically complete at first proceeded at an appreciably slower rate, the absorption mixture which had meanwhile become homogeneous, having taken up 204 grms. of $SO_2$ per litre of said absorption mixture.

By raising the temperature of the resulting solution to about 80–95° C. accompanied by stirring, the $SO_2$ contained therein was expelled, except for a residual quantity of 11.2 grms. of $SO_2$ per litre of xylidine and 2.9 grms. of $SO_2$ per litre of the aqueous phase, the liberated gas being passed, in the first instance, through a reflux condenser, in order, to retain the vapours of xylidine and water.

After the residual absorption mixture—which separated into two layers (xylidine and the aqueous phase) on stirring being suspended—had been cooled, a fresh quantity of the aforesaid gaseous mixture was passed through it at room temperature until approximate saturation had been reached. After repeated expulsion of the absorbed $SO_2$ by heating, the residual absorption mixture still contained 8.0 grms. of $SO_2$ per litre of xylidine and 1.6 grms. of $SO_2$ per litre of the aqueous phase.

In the second repetition of the absorption and decomposition process, the absorption mixture was already appreciably viscous, after absorbing 189 grms. of $SO_2$ per litre of the mixture.

In the third repetition, it was already so viscous, after absorbing only 125 grms. of $SO_2$ per litre, that the absorption could not be carried on any further.

Example Ib

The experiment of Example Ia was repeated, but with the difference that, after the second repetition of the absorption and decomposition process, anhydrous sodium carbonate was added to the xylidine-water mixture, containing xylidine sulphate, until the reaction became slightly alkaline, a corresponding amount of xylidine being liberated whilst the resulting sodium sulphate remained in solution.

Even after six repetitions of the circulation process in the same manner, with addition of sodium carbonate, at least after every second repetition, the absorption mixture, whilst retaining an undiminished capacity for absorbing sulphur dioxide, exhibited no solid deposits during the absorption process.

Example II

Roasting-furnace gases containing 1% by volume of $SO_2$ and 7% by volume of $O_2$, were washed with a mixture of two parts of xylidine, and one part of water, the saturated mixture having absorbed up to 180 grms. of $SO_2$ per litre. After boiling-off the $SO_2$, the mixture was again employed for absorption. After the third repetition of absorption and boiling-off, the mixture—which had again separated into two layers—contained 9 grms. of sulphur, as xylidine sulphate, per litre, the xylidine content in the water being 70 grms. per litre. On renewing the absorption, the thick liquid frothed extensively, so that the process could not be further continued.

30 grms. of calcined soda were thereupon added per litre, at 80° C. After cooling, the xylidine layer was entirely free from sulphate, whereas the water contained 27 grms. of sulphur, as sodium sulphate, and 1.2 grms. of xylidine, per litre. On continuing the absorption, the process went on without any trouble. After every third repetition, an amount of soda corresponding to the increased sulphate content was added until the water contained 45 grms. of sulphate sulphur in the form of Glauber salt, the water being then discarded. The loss of xylidine in this discarded water amounted to only 1.3 grms. per litre.

Example III

A roasting-furnace gas was 7.5% by volume of $SO_2$ and 8% by volume of $O_2$, was washed with a mixture of equal parts of xylidine and water. The saturated mixture contained 220 grms. of $SO_2$ per litre. When, after repeated use of the absorption agent, the sulphate content had increased to 12 grms. of sulphur per litre of the absorption mixture and the aforesaid troubles occurred, 120 grms. of sodium sulphite

$(Na_2SO_3,7H_2O)$ were added during the boiling operation. After the $SO_2$ had been boiled off, the xylidine contained 0.8 grm. of sulphur per litre, whereas the water contained 25 grms. of sulphur, as $SO_4$, and 2.2 grms. of xylidine, per litre. On renewing the absorption, no further troubles were observed.

Example IV

A mixture of 2 parts of water and 1 part of aniline, which had been repeatedly used for absorbing $SO_2$, had become enriched in sulphate sulphur to the extent of 20 grms. per litre, and become very frothy. After boiling-off the $SO_2$ the aniline sulphate was decomposed into free aniline and water-soluble magnesium sulphate by the addition of 53 grms. of magnesium carbonate per litre of the mixture. The regenerated mixture could now be further employed for absorption, until the sulphate value had increased to 40 grms. of sulphur, as $SO_4$, per litre, whereupon the water was discarded, with a loss of only 5 grms. of aniline per litre.

Example V

By heating at about 80 to 95° C. for 8 hours, 40 kgs. of a mixture of equal parts of water and technical xylidine that had become laden with 175 grms. of $SO_2$ per litre, through the action of a gas containing sulphur dioxide, 7 kgs. (equivalent to 2.7 cu. metres) of $SO_2$ were expelled. This $SO_2$ was cooled, to 20° C., and then still contained 1.7 grms. (corresponding to 0.013% by volume) of xylidine in the form of vapour, after which it was washed in two flasks, each charged with 800 cc. of a solution of sodium bisulphite, saturated at 20° C. (350 grms. per litre). After washing the 2.7 cu. metres of $SO_2$, 1.7 grms. (that is, the whole) of the xylidine contained in the gas was found in the first flask, none being detectable in the second flask.

We claim:

1. Process for the production of concentrated sulphur dioxide involving the steps of scrubbing a gas mixture containing $SO_2$ with a fluid mixture containing water and an organic base that is not soluble in considerable degree in water, expelling $SO_2$ from the fluid by heating and reiterating the process with the remaining fluid mixture, the improvement which consists in periodically discarding at least a part of the aqueous phase of the used fluid mixture and adding to said fluid mixture at least before discarding some of the aqueous phase for lowering the loss of organic base therein an inorganic substance selected from the group consisting of oxides, hydroxides, carbonates, bicarbonates, sulphites and bisulphites of the alkali metals, ammonium and magnesium, the said substance being added in an amount which is a substantial excess over the equivalent of the sulphate content of the aqueous phase of the fluid mixture after expulsion of sulphur dioxide therefrom by heating but insufficient to react with all of the sulphur dioxide present in the fluid mixture prior to heating.

2. Process for the production of concentrated sulphur dioxide involving the steps of cycling a fluid mixture comprising water and an organic base that is not soluble in considerable degree in water between a gas- and liquid contact device, wherein the fluid mixture is contacted with an $SO_2$-containing gas mixture, and a fractional distillation device, wherein $SO_2$ is removed from the fluid mixture by heating, periodically discarding at least a part of the aqueous phase of the fluid mixture after leaving the distillation device and before returning to the contact device and adding to the fluid mixture before the same is introduced into the distillation device an inorganic substance selected from the group consisting of oxides, hydroxides, carbonates, bicarbonates, sulphites and bisulphites of the alkali metals, ammonium and magnesium, said substance being added in an amount which is a substantial excess over the equivalent of the sulphuric acid content of the aqueous phase of the fluid mixture after expulsion of sulphur dioxide therefrom by heating but insufficient to react with all of the sulphur dioxide present in the fluid mixture prior to heating, whereby there is formed a water-soluble inorganic salt which is not decomposable at the temperature used for expelling the $SO_2$ from the absorption mixture.

3. The improved process defined in claim 1, characterized in that the fluid mixture comprises toluidine and water.

4. The improved process defined in claim 1, characterized in that effluent gas from the scrubbing step and containing vapor of the organic base and residual $SO_2$ is treated, with an aqueous solution of an inorganic substance selected from the group consisting of oxides, hydroxides, carbonates, bicarbonates, sulphites and bisulphites, of the alkali metals, ammonium and magnesium, the resulting liquid being thereafter added to the scrubbing agent of the first step of the process.

CONWAY, BARON von GIRSEWALD.
HANS WEIDMANN.
GERHARD ROESNER.